(12) United States Patent
Midderhoff et al.

(10) Patent No.: US 9,650,064 B2
(45) Date of Patent: May 16, 2017

(54) OCCUPANCY DETECTION DEVICE FOR DETECTING OCCUPANCY OF A SEAT IN A MOTOR VEHICLE

(75) Inventors: Robert Midderhoff, Aschaffenburg (DE); Thomas Hellerforth, Aschaffenburg (DE)

(73) Assignee: Takata AG, Aschaffenburg (DE)

( * ) Notice: Subject to any disclaimer, the term of this patent is extended or adjusted under 35 U.S.C. 154(b) by 827 days.

(21) Appl. No.: 14/005,150

(22) PCT Filed: Mar. 13, 2012

(86) PCT No.: PCT/EP2012/054365
§ 371 (c)(1),
(2), (4) Date: Dec. 2, 2013

(87) PCT Pub. No.: WO2012/123444
PCT Pub. Date: Sep. 20, 2012

(65) Prior Publication Data
US 2014/0132042 A1    May 15, 2014

(30) Foreign Application Priority Data
Mar. 15, 2011    (DE) .......................... 10 2011 005 551

(51) Int. Cl.
*B62D 1/06* (2006.01)
*B60N 2/56* (2006.01)
(Continued)

(52) U.S. Cl.
CPC ............... *B62D 1/06* (2013.01); *A47C 7/748* (2013.01); *B60N 2/002* (2013.01); *B60N 2/5685* (2013.01);
(Continued)

(58) Field of Classification Search
CPC ...... A47C 7/748; B60N 2/002; B60N 2/5685; B60R 21/01532; B60R 21/0154; B62D 1/06; Y10T 74/20834; H05B 1/0238
See application file for complete search history.

(56) References Cited

U.S. PATENT DOCUMENTS

| 5,525,843 | A | 6/1996 | Höwing |
| 6,283,504 | B1 | 9/2001 | Stanley et al. |

(Continued)

FOREIGN PATENT DOCUMENTS

| CN | 1759025 | 4/2006 |
| DE | 43 38 284 A1 | 5/1995 |

(Continued)

OTHER PUBLICATIONS

International Search Report issued by the German Patent Office on Jun. 13, 2012.

(Continued)

*Primary Examiner* — Geoffrey S Evans
(74) *Attorney, Agent, or Firm* — Meunier Carlin & Curfman LLC

(57) ABSTRACT

Disclosed herein is an occupancy detection device for detecting an occupancy of a seat of a motor vehicle. The occupancy detection device comprises an electric resonant circuit and a sensor element, wherein the electric resonant circuit experiences a change due to a change of the surroundings of the sensor element, so that with reference to the determined electrical parameter an occupancy of the seat can be detected; and a heater control connected with the occupancy detection device such that the sensor element can simultaneously operate as a heater.

15 Claims, 2 Drawing Sheets

(51) Int. Cl.
  *B60R 21/015* (2006.01)
  *H05B 1/02* (2006.01)
  *A47C 7/74* (2006.01)
  *B60N 2/00* (2006.01)

(52) U.S. Cl.
  CPC .... *B60R 21/0154* (2014.10); *B60R 21/01532* (2014.10); *H05B 1/0238* (2013.01); *Y10T 74/20834* (2015.01)

(56) References Cited

U.S. PATENT DOCUMENTS

| | | | |
|---|---|---|---|
| 6,703,845 B2* | 3/2004 | Stanley | B60N 2/002 280/735 |
| 2005/0242965 A1 | 11/2005 | Rieth et al. | |
| 2005/0253712 A1* | 11/2005 | Kimura | B60N 2/002 340/562 |
| 2007/0029768 A1 | 2/2007 | Clos et al. | |
| 2007/0208529 A1 | 9/2007 | Koch et al. | |
| 2008/0011732 A1 | 1/2008 | Ito et al. | |
| 2008/0017625 A1 | 1/2008 | Ito et al. | |
| 2008/0186192 A1* | 8/2008 | Yamanaka | B60R 21/01532 340/667 |
| 2009/0295199 A1 | 12/2009 | Kincaid et al. | |
| 2009/0295411 A1 | 12/2009 | Hansen | |
| 2009/0295554 A1 | 12/2009 | Hansen | |
| 2010/0277186 A1 | 11/2010 | Bieck et al. | |
| 2011/0121618 A1 | 5/2011 | Fischer et al. | |
| 2012/0319701 A1* | 12/2012 | Griffin | B60N 2/002 324/633 |
| 2013/0020305 A1* | 1/2013 | Lamesch | B60N 2/002 219/217 |
| 2013/0098890 A1* | 4/2013 | Virnich | B60N 2/5685 219/204 |
| 2013/0270874 A1* | 10/2013 | Lamesch | B60N 2/002 297/180.12 |
| 2013/0277351 A1* | 10/2013 | Lamesch | B60N 2/002 219/202 |
| 2013/0334196 A1* | 12/2013 | Lamesch | B60N 2/5685 219/217 |

FOREIGN PATENT DOCUMENTS

| | | |
|---|---|---|
| DE | 43 38 285 A1 | 5/1995 |
| DE | 695 02 091 T2 | 8/1995 |
| DE | 197 24 168 C1 | 8/1998 |
| DE | 60 2004 001 516 T2 | 9/2004 |
| DE | 103 11 132 A1 | 9/2004 |
| DE | 10 2007 031 031 A1 | 1/2008 |
| EP | 2 325 060 A2 | 5/2011 |
| JP | 2007099204 | 4/2007 |
| JP | 2008-024087 A * | 2/2008 |
| WO | WO 95/13204 A1 | 5/1995 |
| WO | WO 01/92900 A1 | 12/2001 |
| WO | WO 2004/022409 A2 | 3/2004 |

OTHER PUBLICATIONS

Chinese Office Action with a mailing date of Mar. 7, 2016, issued in corresponding CN Application No. 201280013387.3.
George et al., A Method for Seat Occupancy Detection for Automobile Seats With Integrated Heating Elements, XIX IMEKO World Congress Fundamental and Applied Metrology, Sep. 6-11, 2009, Lisbon, Portugal, pp. 2113-2117.
George et al., A Combined Inductive-Capacitive Proximity Sensor for Seat Occupancy Detection, IEEE Transactions on Instrumentation and Measurement, vol. 59, No. 5, May 31, 2010, pp. 1463-1470.
Notification of First Office Action from corresponding Chinese Application No. 201280013387.3 dated Apr. 30, 2015, 22 pages.

* cited by examiner

OCCUPANCY DETECTION DEVICE FOR DETECTING OCCUPANCY OF A SEAT IN A MOTOR VEHICLE

CROSS-REFERENCE TO A RELATED APPLICATION

This application is a National Phase Patent Application of International Patent Application Number PCT/EP2012/054365, filed on Mar. 13, 2012, which claims priority of German Patent Application Number 10 2011 005 551.7, filed on Mar. 15, 2011.

BACKGROUND

This invention relates to an occupancy detection device for detecting an occupancy of a seat of a motor vehicle.

From the prior art, sensors (occupancy sensors) are known, via which it can be determined whether or not a seat of a motor vehicle is occupied by a vehicle occupant. The information on the occupancy of the seat as determined by the sensors is used in particular for controlling a vehicle occupant restraint system. An occupancy sensor integrated into a vehicle seat is described for example in DE 43 38 285 A1.

SUMMARY

The problem to be solved by the present invention consists in creating an occupancy detection device for occupancy detection, which is usable in the easiest possible way.

According to an exemplary embodiment of the invention, there is provided an occupancy detection device for detecting an occupancy of a seat of a motor vehicle, comprising
an electric resonant circuit which includes a first and a second inductance and at least one sensor element;
means for charging the resonant circuit with an alternating voltage;
means for determining at least one electrical parameter in the resonant circuit, wherein the electric resonant circuit experiences a change due to a change of the surroundings of the sensor element, so that with reference to the determined electrical parameter an occupancy of the seat can be detected; and
a first and a second terminal, via which a heater control can be connected with the occupancy detection device, in order to be able to simultaneously operate the sensor element as heater, wherein the first and the second terminal are arranged such that a direct current provided at these terminals by the heater control is supplied to the sensor element via the first and the second inductance.

By connecting a heater control, which feeds a direct voltage into the sensor element via the first and the second terminal of the occupancy detection device according to the invention, the sensor element simultaneously can be operated as heating element. Due to the fact that feeding the direct voltage into the sensor element is effected via the first and the second inductance, the direct voltage coupled in by the heater control is uncoupled from the alternating voltage fed into the resonant circuit during operation of the occupancy detection device. It therefore is possible to charge the resonant circuit with an alternating voltage and determine an electrical parameter (or several electrical parameters) of the resonant circuit without interrupting the heating operation of the sensor element, i.e. without having to galvanically separate the heater control from the occupancy detection device.

For example, an input terminal of the first inductance is connected with the first terminal of the occupancy detection device, and an input terminal of the second inductance is connected with the second terminal of the occupancy detection device. After connecting a heater control with the first and the second terminal of the occupancy detection device, the heater control thus is connected with the input terminal of the first inductance and with the input terminal of the second inductance, respectively.

The heater control in particular is a heater ECU (ECU=Electronic Control Unit) which is connected e.g. with a battery of the vehicle, which battery provides the direct current to be coupled into the occupancy detection device via the heater control.

According to another exemplary aspect of the invention, the sensor element includes a first terminal (e.g. in the form of a first end) which is connected with an output terminal of the first inductance, and with a second terminal (e.g. with a second end) it is connected with an output terminal of the second inductance.

Furthermore, the occupancy detection device according to the invention can include a first capacitance, which is connected with the input terminal of the first inductance, and a second capacitance, which is connected with the input terminal of the second inductance. In particular, the first and the second capacitance each are connectable with the same reference potential (in particular with the vehicle ground). Due to the first and the second capacitance (and their connection to vehicle ground or to another common potential), a connection conductive for higher frequencies is obtained between the first and the second inductance, i.e. an a.c. voltage short circuit, whereby the determination of the at least one electrical parameter of the resonant circuit and hence the determination of the occupancy of the seat also is possible when no heater control is connected with the occupancy detection device according to the invention. Thus, the occupancy detection device according to the invention also is usable as a mere sensor for determining an occupancy of a seat, i.e. without heating function.

In addition, the a.c. voltage short circuit realized via the first and the second capacitance provides for a determination of the occupancy of the seat substantially independent of tolerances of the heater control and also for the case that a heater control connected with the occupancy detection device fails or the connection between the heater control and the occupancy detection device according to the invention is interrupted or damaged.

It should be noted that the wording according to which the occupancy detection device is formed for detecting an occupancy of "a seat" does not necessarily mean that the occupancy detection device or at least the sensor element must be arranged in a vehicle seat of the motor vehicle. This is conceivable, wherein in particular the sensor element is arranged in a seating surface and/or a backrest of the motor vehicle. It is, however, also possible that the sensor element is arranged in or at a steering wheel of the motor vehicle. It is of course also possible that several sensor elements are provided, of which e.g. one is integrated into the vehicle seat and another one is arranged in or at the steering wheel. For example, the occupancy detection device comprises several resonant circuits, to which in particular one sensor element each is associated.

In the case of a sensor element arranged in a vehicle seat, a further capacitance and a further resistance appear as additional components of the resonant circuit, when the seat is occupied by a vehicle occupant, so that the electrical parameter (e.g. the resonance frequency of the resonant circuit, see below) determinable by the occupancy detection device according to the invention is changed. Via this change of the electrical parameter an occupancy of the vehicle seat can be detected.

If the sensor element is arranged in a steering wheel of the motor vehicle, a further capacitance and a further resistance are generated by the vehicle occupant touching the steering wheel, so that analogous to the seat-integrated sensor element the electrical parameter of the resonant circuit measured by the occupancy detection device is changed.

An "electrical parameter" of the resonant circuit determined in operation by the occupancy detection device in particular is a voltage tapped at a point of the resonant circuit, wherein with reference to this voltage e.g. a resonance frequency and/or resonance amplitude of the resonant circuit can be determined. When a seat is occupied, the resonance frequency or resonance amplitude is changed due to the contact of the vehicle occupant with a seating surface of the vehicle seat and/or the contact with the steering wheel, so that the occupancy of the seat is detectable with reference to the change of these parameters.

For example, the sensor element includes an electrically conductive structure which can be integrated into a vehicle seat or a steering wheel of the vehicle. For example, the electrically conductive structure is an electric line (e.g. a wire) or an electric conductor path arranged on a carrier element. It is conceivable that initially only the conductive structure without the remaining components of the occupancy detection device is arranged in the seat (or in the steering wheel), and the remaining components only subsequently are mounted in the vehicle (in particular at another point than the conductive structure) and electrically connected with the conductive structure.

It should be noted that the present invention is not limited to the use of an electric line or conductor path as sensor element. Rather, it is also conceivable that e.g. a flat element is used as sensor element.

The first and the second inductance in particular are formed by a first and a second coil, wherein e.g. the d.c. resistance of the coils is rather small as compared to the d.c. resistance of the sensor element, so as not to disturb the heating function of the sensor element. For example, the d.c. resistance of the two coils each is not more than one tenth or not more than one hundredth of the d.c. resistance of the sensor element. In particular, the d.c. resistance of the coils each lies in the mOhm range, while the d.c. resistance of the sensor element lies in the Ohm range.

According to another exemplary aspect of the invention, the means for charging the resonant circuit with an alternating voltage include a voltage-controlled oscillator, i.e. a "VCO" (Voltage Controlled Oscillator). In addition, the means for charging the resonant circuit with an alternating voltage can comprise a sine shaper cooperating with the voltage-controlled oscillator. Furthermore, it is conceivable that the means for determining an electrical parameter are formed for determining the resonance frequency and/or the resonance amplitude of the electric resonant circuit. For example, these means include a correspondingly designed microcontroller and/or a peak-to-peak detector.

According to another exemplary development of the invention, the electric resonant circuit comprises a capacitance connected in series with a further inductance. Furthermore, an additional resistance can be provided, which is connected in series with the further inductance and the capacitance. For example, via the means for determining properties of the resonant circuit a voltage at the end of the capacitance connected in series with the additional inductance is determined.

The invention also relates to a vehicle seat arrangement for a motor vehicle with a vehicle seat and an occupancy detection device according to the invention as described above, wherein the sensor element is arranged in the vehicle seat. Furthermore, the occupancy detection device, as described above, can be connected with a heater control.

Furthermore, the invention also relates to a steering wheel arrangement for a motor vehicle with a steering wheel and an occupancy detection device according to the invention as described above, wherein the sensor element is arranged in or at the steering wheel. Here as well, the occupancy detection device according to the invention, as described above, can be coupled with a heater control.

The invention will subsequently be explained in detail by means of exemplary embodiments with reference to the Figures.

DETAILED DESCRIPTION

Figure 1:
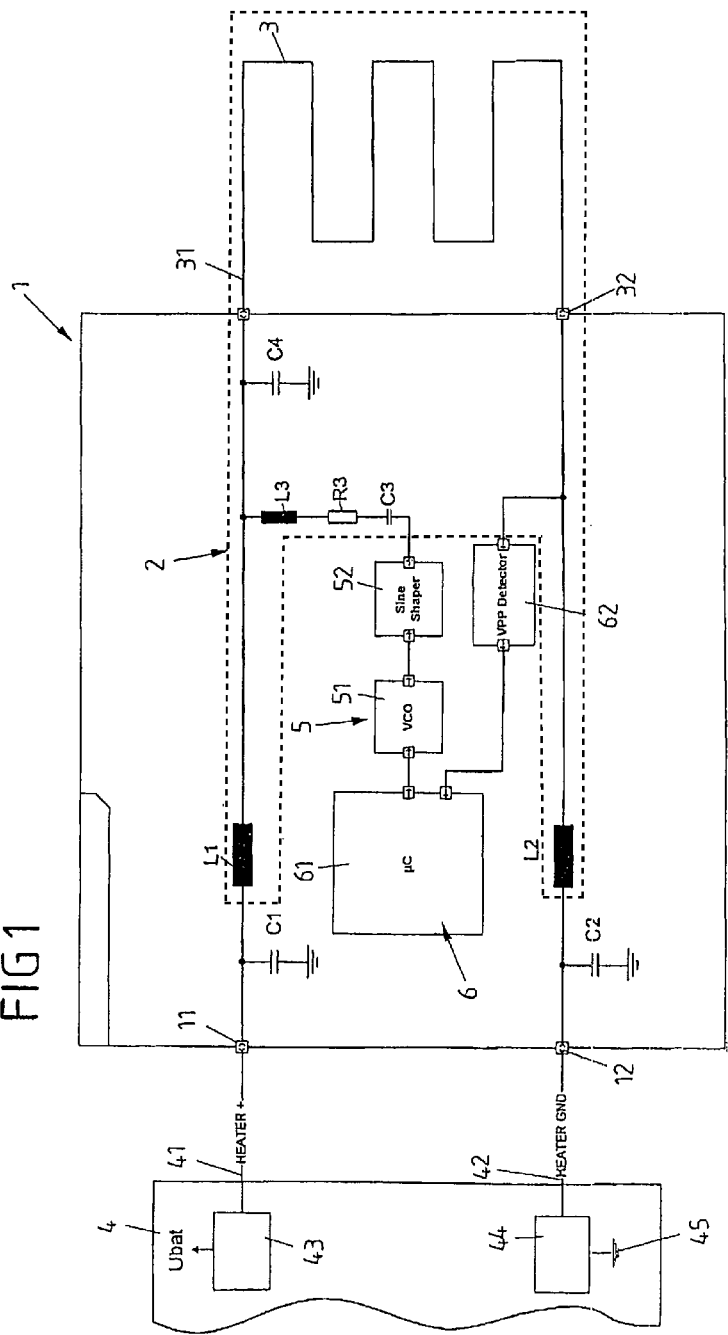
FIG. 1 shows an occupancy detection device according to an exemplary embodiment of the invention.

The occupancy detection device 1 according to the invention as shown in FIG. 1 for detecting an occupancy of a seat of a motor vehicle, which in particular is formed in the manner of a CIS unit (Capacitive Interior Sensing unit), comprises an electronic circuitry with an electric resonant circuit 2. The electric resonant circuit 2 includes a first and a second inductance L1, L2 as well as a series connection with a further inductance L3, a resistance R3 and a capacitance C3.

Furthermore, the electric resonant circuit 2 of the occupancy detection device 1 comprises a sensor element in the form of a wound electrically conductive sensor wire 3, wherein a first terminal in the form of a first end 31 of the sensor wire 3 is connected with the first inductance L1 and a second terminal in the form of a second end 32 of the sensor wire 3 is connected with the second inductance L2. The first end 31 of the sensor wire 3 in addition is connected with a further capacitance C4, via which a tuning of the resonant circuit can be performed (see below). Via the sensor wire 3, a change of the surroundings of the sensor wire and hence an occupancy of a seat can be registered, as will be explained below.

The respectively other terminals of the inductances L1, L2, which are not connected with the sensor wire 3, each are connected with a terminal 11, 12 of the occupancy detection device 1, wherein a heater control ("heater ECU") 4 is connected to the occupancy detection device 1 via the terminals 11, 12. The heater control 4 includes contacts 41, 42 via which a direct current is provided at the terminals 11, 12, which is supplied to the sensor wire 3 via the first and the second inductance L1, L2, so that the sensor wire 3 can be operated not only as sensor element, but also as heating element.

The input terminals of the first and the second inductance L1, L2, which are connected with the terminals 11, 12, in addition are each connected with further capacitances C1 and C2, wherein the capacitances C1, C2 each are connected with the vehicle ground (or another reference potential) with their terminals not connected with the inductances. Via the capacitances C1, C2 an a.c. voltage short circuit is obtained between the inductances L1, L2, so that even in the case of a defect of the heater control 4 or when the heater control 4 is separated from the occupancy detection device 1, the sensor wire 3 can be charged with an alternating voltage, i.e. an occupancy detection via the sensor wire also is possible in these cases.

For example via a switch 43 (e.g. in the form of a "high-side switch", i.e. a switch which is connected with a potential more positive as compared to the other contact of the heater control 4) the contact 41 of the heater control 4 is connected with a battery which provides a voltage ("Ubat"). The second contact 42 of the heater control 4 can e.g. likewise be connected with another potential, in particular the vehicle ground 45, via a switch (e.g. in the form of a "low-side switch").

The occupancy detection device 1 according to the invention furthermore includes means 5 for charging the resonant circuit 2 with an alternating voltage, wherein via the inductances L1, L2 uncoupling of the direct voltage fed in by the heater control 4 from the alternating voltage fed in by the means 5 is effected. Furthermore, the occupancy detection device 1 comprises means 6 for determining an electrical parameter in the resonant circuit, which in particular comprise a microcontroller 61 and a peak-to-peak detector 62.

Figure 2:
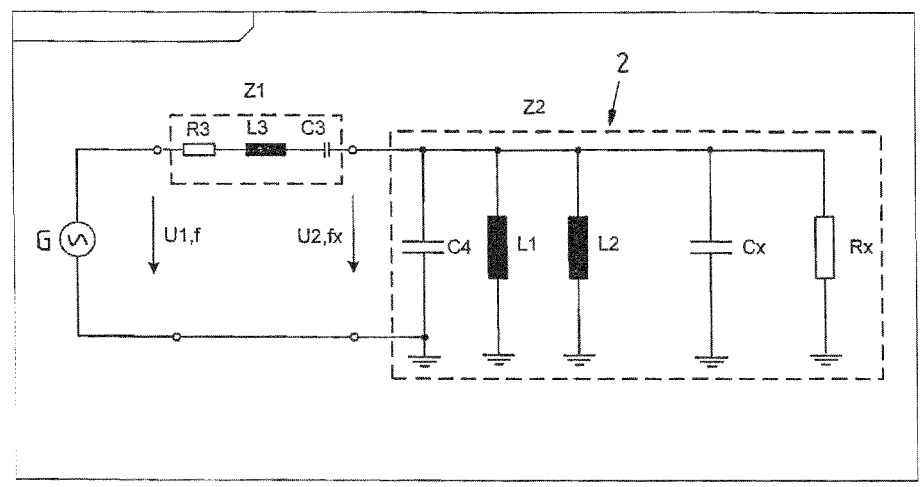
FIG. 2 shows an a.c. voltage equivalent circuit diagram of the occupancy detection device of FIG. 1.

The circuitry of the occupancy detection device 1 also is shown in the equivalent circuit diagram of FIG. 2. Accordingly, the means for charging the resonant circuit 2 with an alternating voltage comprise a function generator G, which is composed of a voltage-controlled oscillator 51 and a sine shaper 52 (FIG. 1) and which via a first terminal is connected with the series connection of inductance L3, resistance R3 and capacitance C3 and with a second terminal with a reference potential (in particular the vehicle ground). The inductances L1 and L2 likewise are connected with the vehicle ground, wherein this connection in particular is effected via the capacitances C1 and C2 shown in FIG. 1.

Via the function generator G an alternating voltage U1 with a frequency f is fed into the resonant circuit 2 and at the output of the series connection of inductance L3, resistance R3 and capacitance C3 an electrical parameter in the form of a voltage U2 is measured. The voltage U2 depends on the frequency f of the voltage U1 fed in, wherein the voltage U2 has its greatest value at the resonance frequency fx of the resonant circuit 2. This resonance frequency fx of course depends on the electrical parameters of the components of the resonant circuit 2, i.e. on the two inductances L1, L2 as well as the series-connected components inductance L3, resistance R3 and capacitance C3 as well as the capacitance C4.

After mounting the occupancy detection device according to the invention in a vehicle and upon occupancy of a seat to which the occupancy detection device is associated, the resonant circuit 2 experiences a change in that an additional capacitance Cx and an additional resistance Rx appear in the region of the sensor wire 3. Thus, the voltage U2 measured in the resonant circuit changes in dependence on whether or not the seat is occupied, and also depending on the kind of occupancy (e.g. depending on the size of the vehicle occupant occupying the seat). Correspondingly, the resonance frequency determined via U2 (i.e. the frequency at which the voltage U2 has a maximum) and the resonance amplitude (i.e. the amount or the peak-to-peak value of the voltage U2) changes.

It should be noted that the capacitances C1, C2 as well as the resistance of the sensor wire 3 have been neglected in the equivalent circuit diagram of FIG. 2, since their (blind) resistance values are small as compared to the frequency f of the voltage fed in and the parameters Cx and Rx.

For example, the sensor wire 3 can be integrated into the seating surface of a vehicle seat, wherein upon occupancy of the vehicle seat by a vehicle occupant the capacitance Cx (occupancy capacitance) and the resistance Rx (occupancy resistance) are obtained as additional components of the resonant circuit. Thus, upon occupancy of the vehicle seat a changed resonance frequency as compared to the case of non-occupancy and a changed resonance amplitude are measured, so that by determining the frequency at which the voltage U2 has its maximum, it can be determined whether or not the vehicle seat is occupied. In particular, the resonance frequency of the resonant circuit is inversely proportional to Cx.

The amount of the voltage U2 (i.e. the resonance amplitude) at the resonance frequency, on the other hand, is proportional to the additional resistance Rx.

When the sensor wire 3 is arranged in or at a steering wheel of the vehicle, there is also obtained the additional capacitance Cx and the additional resistance Rx, so that the above-described procedure for occupancy detection is applicable analogously. In particular, the capacitance Cx changes in dependence on whether or not the vehicle occupant touches the steering wheel, so that touching of the steering wheel and hence an occupancy of the seat can be determined via the determination of the resonance frequency (or via a determination of the change of the resonance frequency) of the resonant circuit.

Figure 3:
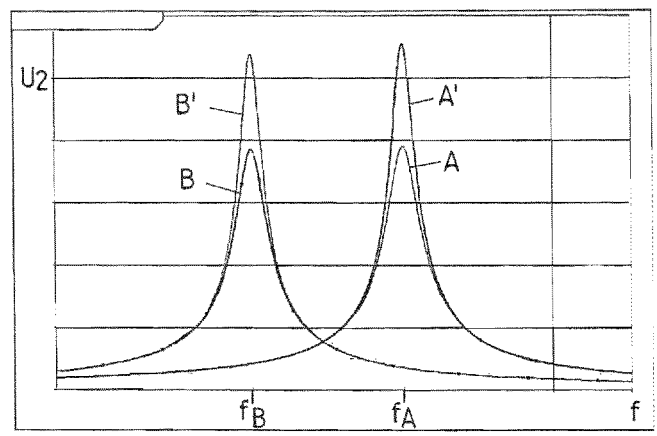
FIG. 3 shows the resonance behavior of the occupancy detection device of FIG. 1.

In the following, the occupancy detection will be explained by way of example for a seat-integrated sensor wire 3 with reference to FIG. 3. This Figure shows a measurement of the voltage U2 (y-axis) over the frequency (x-axis), wherein the input voltage U1 has been varied over a specified frequency range.

The measurement curve A relates to the situation that a child seat is arranged on the vehicle seat, wherein the voltage U2 reaches a maximum at a frequency $F_A$ (the resonance frequency of the resonant circuit). The curve B, however, relates to the case that a man as vehicle occupant occupies the vehicle seat, wherein the man produces a greater capacitance Cx than the child seat. In this case, the resonance frequency $f_B$ of the resonant circuit is smaller than in the case of the child seat, so that (in particular after a calibration of the occupancy detection device) an occupancy classification can be effected with reference to the location of the resonance frequency, i.e. it can not only be decided whether an occupancy of the seat has been effected, but also what kind of occupancy exists.

The curves A' and B' each relate to a moist condition of the vehicle seat, which causes a smaller resistance Rx and thus each a greater resonance amplitude (maximum amplitude of the voltage U2) or quality of the resonant circuit. Thus, when using both the resonance frequency and the resonance amplitude, a refined occupancy classification can be effected.

The location of the resonance frequency of the resonant circuit can be adjusted in particular via the capacitance C4, so that the frequency range in which the resonance frequency lies in dependence on the capacitance Cx and Rx is preadjustable via the choice of the capacitance C4. The maximum resonance amplitude can be preadjusted by designing the inductance L3, the capacitance C3 and/or the resistance R3.

The generation of the alternating voltage is effected, as already mentioned above, via the VCO 51 and the sine shaper 52, so that an alternating voltage in the form of a sinusoidal voltage with constant amplitude is fed into the resonant circuit 2, whose frequency is variable by means of the VCO. Finding and measuring the resonance frequency of the resonant circuit is effected via the microcontroller 61, while the amplitude of the voltage U2 is determined in a frequency-dependent manner with the peak-to-peak detector 62. An occupancy classification in particular is effected with reference to the resonance frequency and the peak-to-peak voltage (the voltage U2) measured at the resonance frequency.

The invention claimed is:

1. An occupancy detection device for detecting an occupancy of a seat of a motor vehicle, comprising
   an electric resonant circuit which includes a first and a second inductance and at least one sensor element;
   means for charging the resonant circuit with an alternating voltage; and
   a microcontroller and a peak-to-peak detector, wherein the microcontroller and the peak-to-peak detector are used to determine a resonance frequency or a resonance amplitude in the resonant circuit, wherein the electric resonant circuit experiences a change in the resonance frequency or the resonance amplitude due to a change of the surroundings of the sensor element, so that an occupancy of the seat can be detected; and
   a first and a second terminal, via which a heater control can be connected with the occupancy detection device, in order to be able to simultaneously operate the sensor element as heater, wherein the first and the second terminal are arranged such that a direct current provided at these terminals by the heater control is supplied to the sensor element via the first and the second inductance.

2. The occupancy detection device according to claim 1, wherein an input terminal of the first inductance is connected with the first terminal and an input terminal of the second inductance is connected with the second terminal.

3. The occupancy detection device according to claim 2, wherein the sensor element includes a first terminal, which is connected with the output terminal of the first inductance, and a second terminal, which is connected with an output terminal of the second inductance.

4. The occupancy detection device according to claim 2, further comprising a first capacitance, which is connected with the input terminal of the first inductance, and a second capacitance, which is connected with the input terminal of the second inductance.

5. The occupancy detection device according to claim 4, wherein the first and the second capacitance each include a first terminal which is connected with the first and the second inductance, respectively, and a second terminal which is connectable with a reference potential.

6. The occupancy detection device according to claim 1, wherein the sensor element includes an electrically conductive structure which can be integrated into a vehicle seat and/or a steering wheel of the vehicle.

7. The occupancy detection device according to claim 1, wherein the first and the second inductance are formed by a first and a second coil.

8. The occupancy detection device according to claim 7, wherein the d.c. resistance of the two coils each is not more than one tenth or not more than one hundredth of the d.c. resistance of the sensor element.

9. The occupancy detection device according to claim 1, wherein the electric resonant circuit includes a capacitance connected in series with a further inductance.

10. The occupancy detection device according to claim 1, wherein the means for charging the resonant circuit with an alternating voltage include a voltage-controlled oscillator.

11. The occupancy detection device according to claim 10, wherein the means for charging the resonant circuit with an alternating voltage include a sine shaper cooperating with the voltage-controlled oscillator.

12. The occupancy detection device according to claim 1, wherein the microcontroller and the peak-to-peak detector are used to determine at least one of a resonance frequency or a resonance amplitude of the electric resonant circuit.

13. The occupancy detection device according to claim 12, wherein the peak-to-peak detector is used to determine a voltage in the resonant circuit.

14. A vehicle seat arrangement for a motor vehicle, comprising a vehicle seat and an occupancy detection device according to claim 1, wherein the sensor element is arranged in the vehicle seat.

15. A steering wheel arrangement for a motor vehicle, comprising a steering wheel and an occupancy detection device according to claim 1, wherein the sensor element is arranged in or at the steering wheel.

* * * * *